(12) United States Patent  
Goodhall et al.

(10) Patent No.: US 9,290,117 B2  
(45) Date of Patent: Mar. 22, 2016

(54) ARMREST LOCK FOR VEHICLE SEAT

(75) Inventors: Shane A. Goodhall, Northville, MI (US); Steve Terence Green, Northville, MI (US); Ian Patterson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 427 days.

(21) Appl. No.: 13/551,959

(22) Filed: Jul. 18, 2012

(65) Prior Publication Data

US 2014/0021764 A1  Jan. 23, 2014

(51) Int. Cl.
*B60N 2/46* (2006.01)

(52) U.S. Cl.
CPC ................... *B60N 2/4613* (2013.01)

(58) Field of Classification Search
USPC ............................ 297/411.32, 411.38, 378.13
See application file for complete search history.

(56) References Cited

U.S. PATENT DOCUMENTS

| | | |
|---|---|---|
| 5,658,043 A | 8/1997 | Davidson |
| 5,947,554 A * | 9/1999 | Mashkevich .................. 297/115 |
| 6,299,253 B1 * | 10/2001 | Chen ............................. 297/353 |
| 6,328,384 B1 * | 12/2001 | Yamauchi et al. ........ 297/411.29 |
| 2004/0046434 A1 * | 3/2004 | Zelmanov et al. ........ 297/378.13 |
| 2007/0007811 A1 * | 1/2007 | Chung ..................... 297/411.38 |
| 2008/0150341 A1 | 6/2008 | Salewski |
| 2011/0156452 A1 | 6/2011 | Schumm et al. |

FOREIGN PATENT DOCUMENTS

WO            0015935 A1       3/2000

\* cited by examiner

*Primary Examiner* — Sarah McPartlin  
(74) *Attorney, Agent, or Firm* — LeClairRyan

(57) ABSTRACT

A lock assembly for selectively and releasably holding a pivoting armrest of a vehicle in place relative to an adjacent seat back is disclosed. The lock assembly includes a first locking element fixedly attached to the seat back and a second locking element movably attached to the armrest. Both locking elements have engagement surfaces whereby the second locking element is releasably engageable with the first locking element. The first locking element includes a cover that, together with a base, defines a pocket. The second locking element includes a spring loaded attachment assembly. The assembly provides operator-movable attachment to the armrest. The second locking element further includes an engagement portion on which the engagement surface is formed and an anchoring portion. An operator-manipulable release tab extends from the engagement portion and through the tab-passing slot of the first locking element when the first and second locking elements are engaged.

16 Claims, 4 Drawing Sheets

ARMREST LOCK FOR VEHICLE SEAT

TECHNICAL FIELD

The disclosed invention relates generally to armrests for vehicle seats. More particularly, the disclosed invention relates to a lock for releasably locking an armrest in its stowed position.

BACKGROUND OF THE INVENTION

The second row seats of many vehicles typically are bench seats that include an armrest that pivots freely in the center occupant location. The armrest is in its down position when there is no occupant seated in the center location.

Because the armrest is freely pivotable, there is ordinarily no locking mechanism provided to hold it in one position or the other. However, under any one of a variety of circumstances, it may be preferred to have the armrest locked in its upright or stowed position.

One of the reasons locks are not generally provided to hold the armrest in place is that typically locks and latches require an operator to move an actuator in both the locking and unlocking directions along with a third motion to hold in place the lock itself just to make sure the lock does not work its way open.

Accordingly, a system of locking a pivoting armrest into its upright position remains desirable yet wanting.

SUMMARY OF THE INVENTION

The disclosed invention provides a lock assembly for selectively and releasably holding one component of a vehicle seat in place relative to another component of a vehicle seat. Preferably but not absolutely one component is a pivoting armrest and the other component is an adjacent seat back.

The lock assembly of the disclosed invention retains the pivoting armrest in its upright or stowed position and may be released to pivotably lower the armrest to its down position. The lock assembly according to the disclosed invention includes a first locking element fixedly attached to the seat back and a second locking element movably attached to the armrest. The first locking element has an engagement surface and the second locking element has an engagement surface. The second locking element is releasably engageable with the first locking element.

A series of engagement channels are defined on one of the engagement surfaces while a series of ridges are formed on the other engagement surface. The ridges are releasably engageable with the channels.

The first locking element includes a cover that, together with a base, defines a pocket. The engagement surface is formed on the interior. The first locking element further includes a tab-passing slot.

The second locking element includes a spring loaded attachment assembly. The assembly provides operator-movable attachment to the armrest. The second locking element further includes an engagement portion on which said engagement surface is formed and an anchoring portion. The spring loaded attachment assembly includes a central sliding rod attached to the engagement portion and a retractor spring attached to the central sliding rod. An operator-manipulable release tab extends from the engagement portion and through the tab-passing slot of the first locking element when the first and second locking elements are engaged.

In its down position the armrest is not locked into place. When the armrest is pivoted to its upright or stowed position the first locking element becomes engaged with the second locking element by releasable engagement of the series of ridges with the series of engagement channels. To release the armrest from its upright and locked position the operator moves the release tab to thereby release the ridges from the channels, thus allowing the armrest to be again moved to its down position.

While latches are not commonly known for holding an armrest in a given position, where locks are utilized as noted above locks and latches ordinarily require movement of an actuator by an operator in both the locking and unlocking directions along with a subsequent motion to hold in place the lock itself, thereby assuring that the lock does not work its way open. The disclosed invention requires only the unlocking action that releases the armrest from its upright or stowed position.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
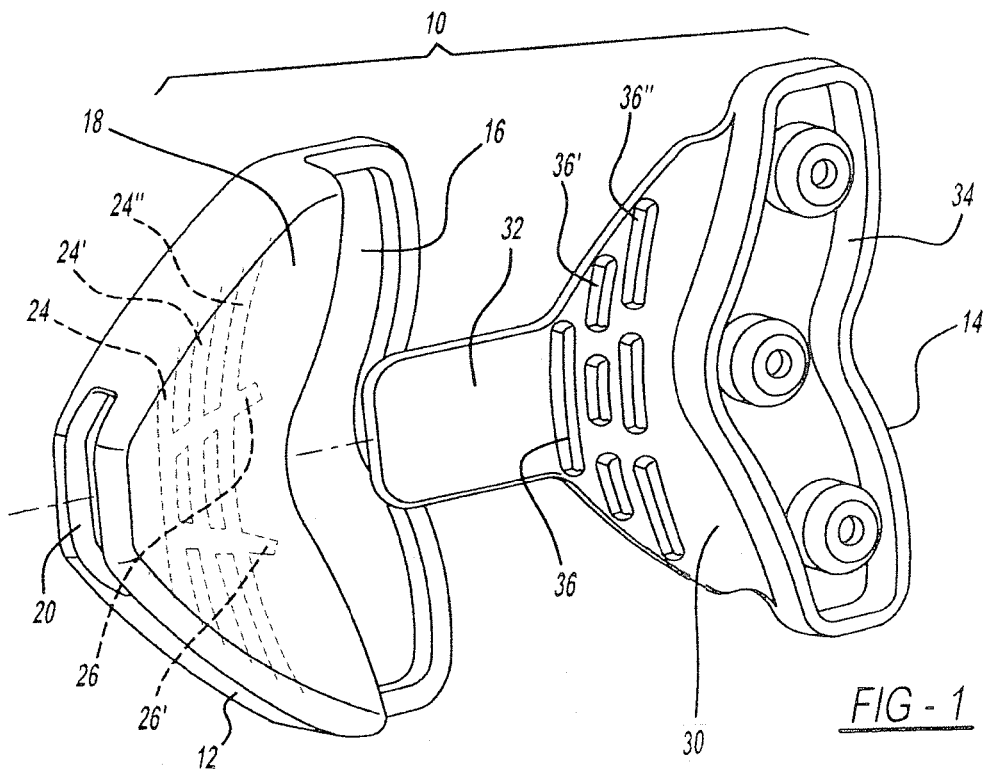
FIG. 1 is a perspective view of the two components of the lock assembly of the disclosed invention shown spaced apart in their pre-engaged positions.

In the following figures, the same reference numerals will be used to refer to the same components. In the following description, various operating parameters and components are described for different constructed embodiments. These specific parameters and components are included as examples and are not meant to be limiting.

Figure 2:
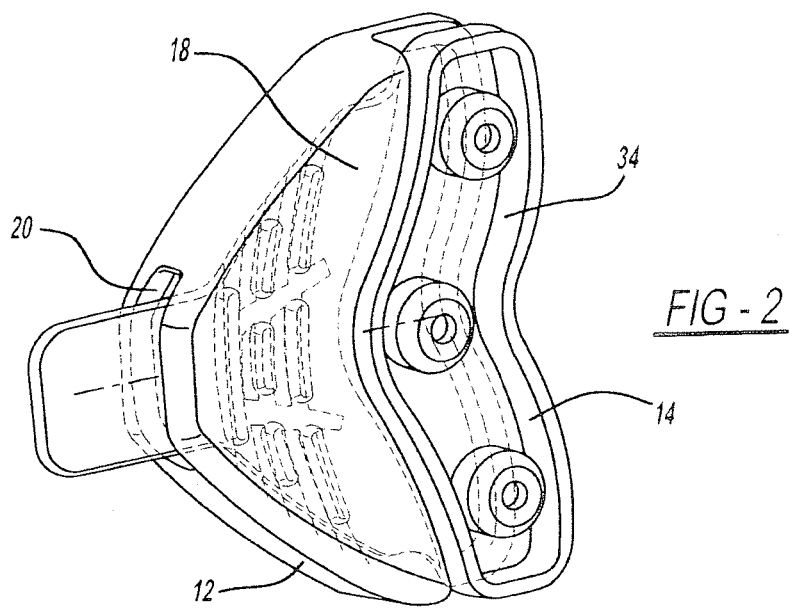
FIG. 2 is a perspective view of the two components of the lock assembly of the disclosed invention shown in their locked positions.
Figure 3:
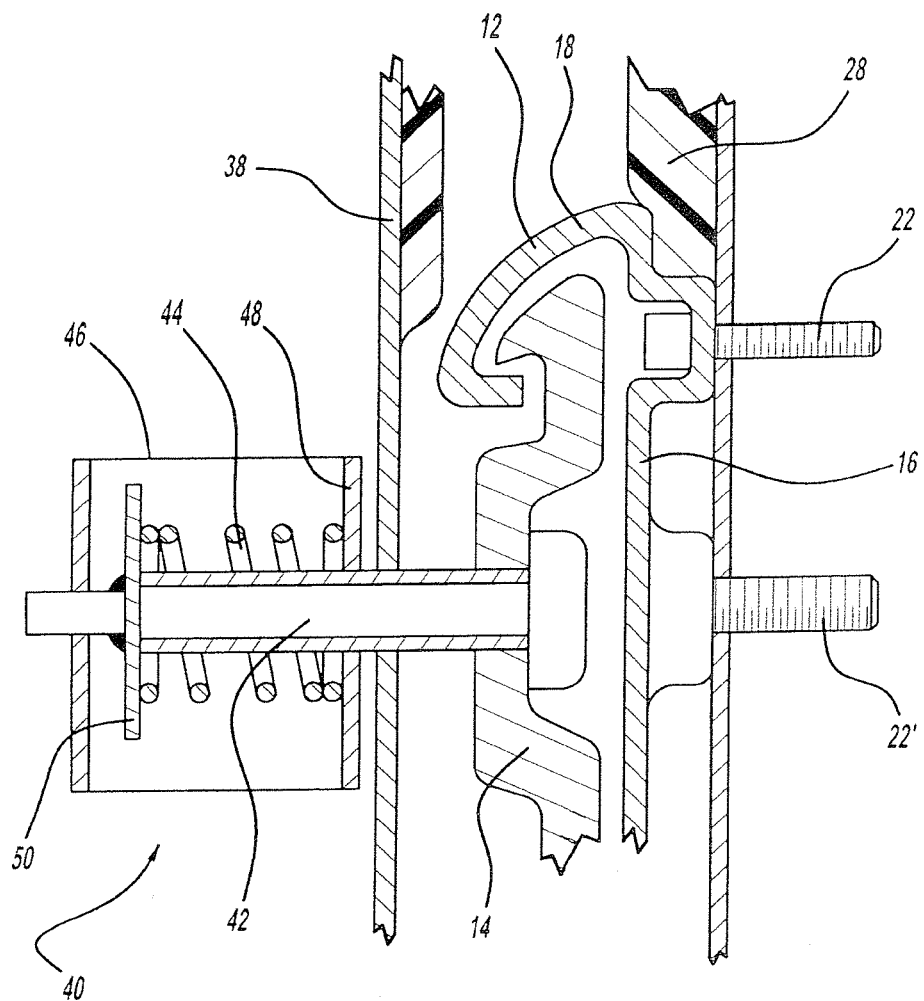
FIG. 3 is a sectional view of the two components of the lock assembly of the disclosed invention shown in their locked positions.

With respect to FIGS. 1, 2 and 3, a lock assembly (or "lockshoe") according to the disclosed invention and generally illustrated as 10, is shown. The lock assembly 10 includes a cupped shoe 12 and a molded lock plate 14. Preferably but not necessarily the cupped shoe 12 is fixed to the vehicle seat frame while the molded lock plate 14 is fixed to the vehicle armrest. While placement on or the other of the vehicle seat and the armrest is optional, regardless of the component selected for placement it is necessary that the cupped shoe 12 and the molded lock plate 14 be placed opposite one another on adjacent surfaces.

The cupped shoe 12 releasably receives the molded lock plate 14 as will be described below. The cupped shoe 12 includes a base 16 and an integrally formed cover 18. A tab-passing slot 20 is formed between the base 16 and the cover 18. The tab-passing slot 20 is illustrated in FIGS. 1 and 2. Extending from the backside of the base 16 are attachment studs of which two, fasteners 22 and 22', are illustrated. It is to be understood that while threaded studs have been illustrated as fasteners 22 and 22' it is not necessary that the fasteners be threaded studs as other fasteners, such as but not limited to snap fasteners or rivets, may be used as well.

On the interior surface of the cover 18 are defined channels that include a series of three roughly parallel channels 24, 24', and 24" and a pair of intersecting channels 26 and 26'. A greater or lesser number of channels may be provided. The arrangement of the channels might be altered as well.

The attachment fasteners 22 and 22' are provided to attach the cupped shoe 12 preferably to a vehicle seat structure, such as a vehicle seat frame 28. The cupped shoe 12 has no moving elements.

The molded lock plate 14 is releasably engagable with the cupped shoe 12. The molded lock plate includes an engagement portion 30, a tab 32 extending from the engagement portion 30, and an anchoring portion 34. The tab 32 is removably insertable into the tab-passing slot 20 of the cupped shoe 12.

The face of the engagement portion 30 has formed thereon a series of ridges that include a set of generally parallel ridges 36, 36' and 36". A greater or lesser number of ridges may be provided. In addition, while the ridges 36, 36' and 36" are illustrated as being broken and interrupted the ridges can be continuous. The arrangement of the ridges might be altered as well. The ridges 36, 36' and 36" are configured so as to substantially fit into and thus engage the channels 24, 24', and 24" respectively. This engagement is illustrated in FIG. 2. It should also be understood that while the ridges 36, 36' and 36" are illustrated as being formed on the molded lock plate 14 and the channels 24, 24' and 24" as being formed on the cover 18 the opposite may be true as well.

Figure 4:
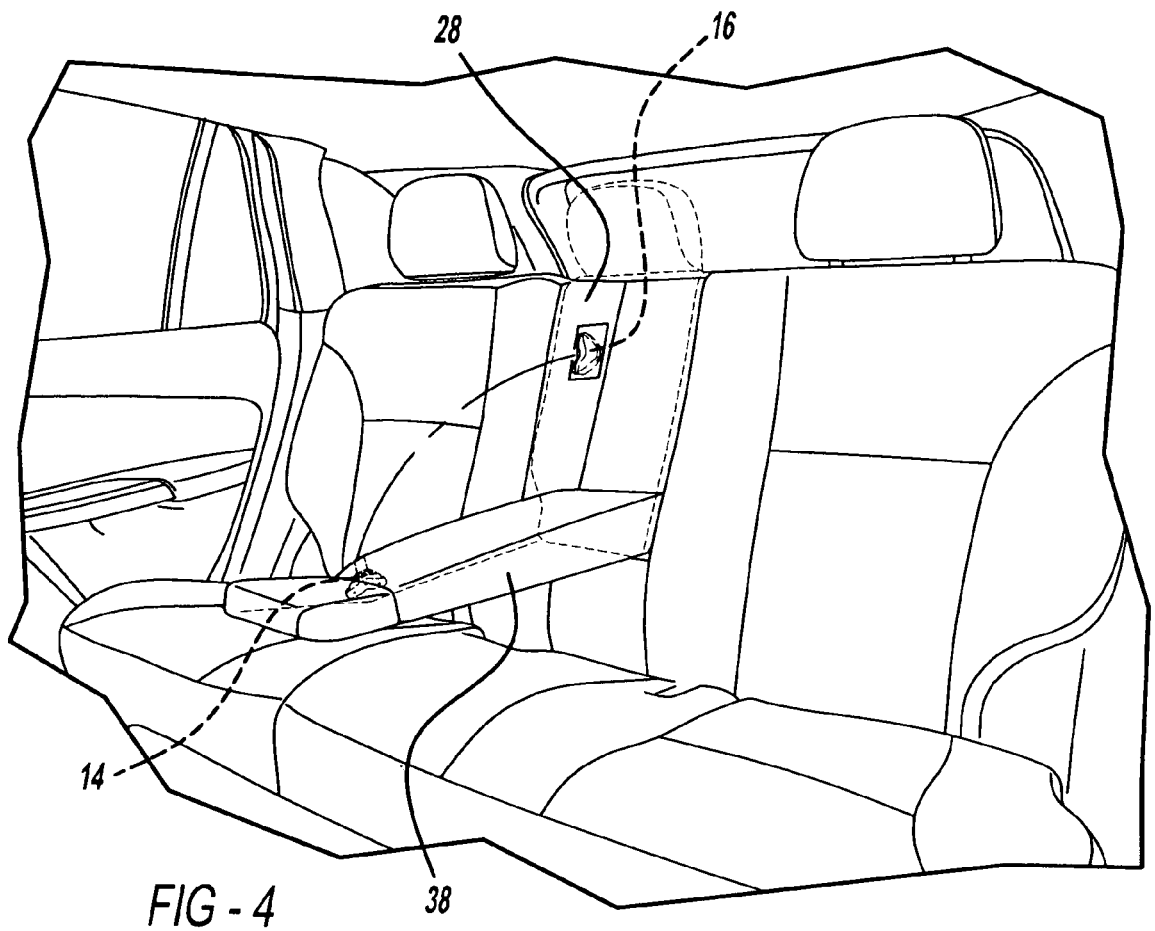
FIG. 4 is a perspective view illustrating the lock assembly of the disclosed invention in use in relation to an armrest of the second row of a vehicle, shown in its down position, and illustrating the same armrest in its stowed position in broken lines.

While the cupped shoe 12 is fixedly engaged to the vehicle seat structure 28 by way of attachment studs including the attachment fasteners 22 and 22', the molded lock plate 14 is attached to an adjacent seat element, such as an armrest 38, by a spring loaded attachment assembly 40. One embodiment of the anticipated arrangement of the cupped shoe 12 and the molded lock plate 14 is illustrated in FIG. 4 which is an illustration of the vehicle set structure 28 relative to the armrest 38. According to the embodiment of FIG. 4, the cupped shoe 12 is fitted to an inner surface of the vehicle seat structure 28 while the molded lock plate 14 is fitted to an outer surface of the armrest 38. When the armrest 38 is pivoted to its upright position the molded lock plate 14 engages the cupped shoe 12.

The attachment assembly 40 includes a geometrically profiled sliding rod 42 that is attached directly to the anchoring portion 34 of the molded lock plate 14, and a tensioned retracting member 44 having a compressive force that urges the molded lock plate 14 toward the armrest 38. It is to be understood that while a helical spring is shown other tensioning members, such as a cantilever spring or a star or Belleville washer, may also be used.

The attachment assembly 40 further includes an attachment base housing 46 in which a portion of the sliding rod 42 and the tensioned retracting member 44 are housed. The base housing 46 includes an end wall 48. An end cap 50 is fitted to the end of the sliding rod 42 and retains the tensioned retracting member 44 in tension against the end wall 48 of the base housing 46.

Figure 5:
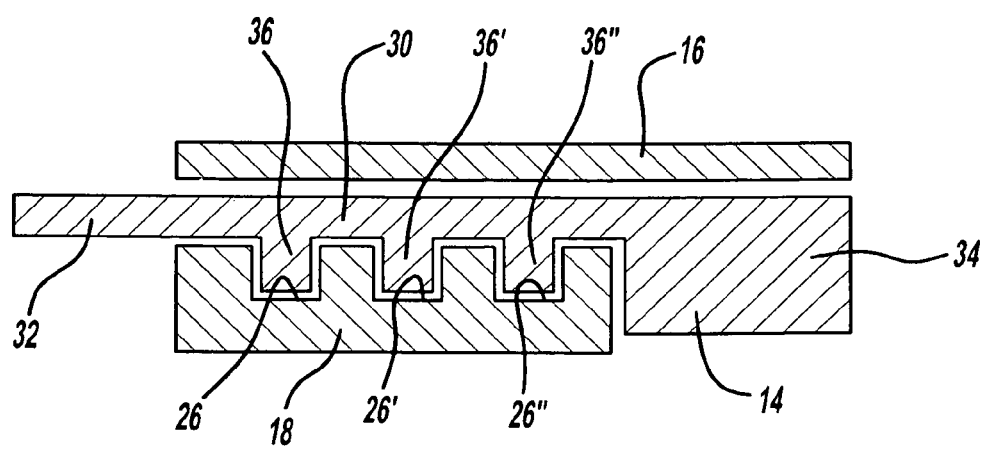
FIG. 5 is a sectional view showing the engagement of one component of the lock assembly of the disclosed invention with another.

The ridges 36, 36' and 36" are configured so as to substantially fit into and thus engage the channels 24, 24', and 24" respectively when the molded lock plate 14 engages the cupped shoe 12. This engaged arrangement is shown in FIG. 5 in which the channels ridges and channels are interlocked as seen in cross-section.

Optionally, the surfaces of either or both of the engagement portion 30 and interior surface of the cover 18 may be lined with a coating to limit or eliminate squeaks and rattles. The coating may be any of several materials, including a polymerized coating.

The attachment assembly 40 is configured so as to allow the operator, by moving the tab 32 away from the armrest 38 and toward the seat structure 38, to effect release of the molded lock plate 14 from the cupped shoe 12. The tensioned retracting member 44 causes the lock plate 14 to remain engaged with the cupped shoe 12 when the two components are brought into contact with one another. By moving the tab 32 in the direction toward the armrest 38 the tension of the tensioned retracting member 44 is removed and the ridges 36, 36' and 36" are disengaged from the channels 24, 24', and 24". Once disengaged the armrest 38 may be pivoted to its down position as illustrated in FIG. 4.

Figure 6:
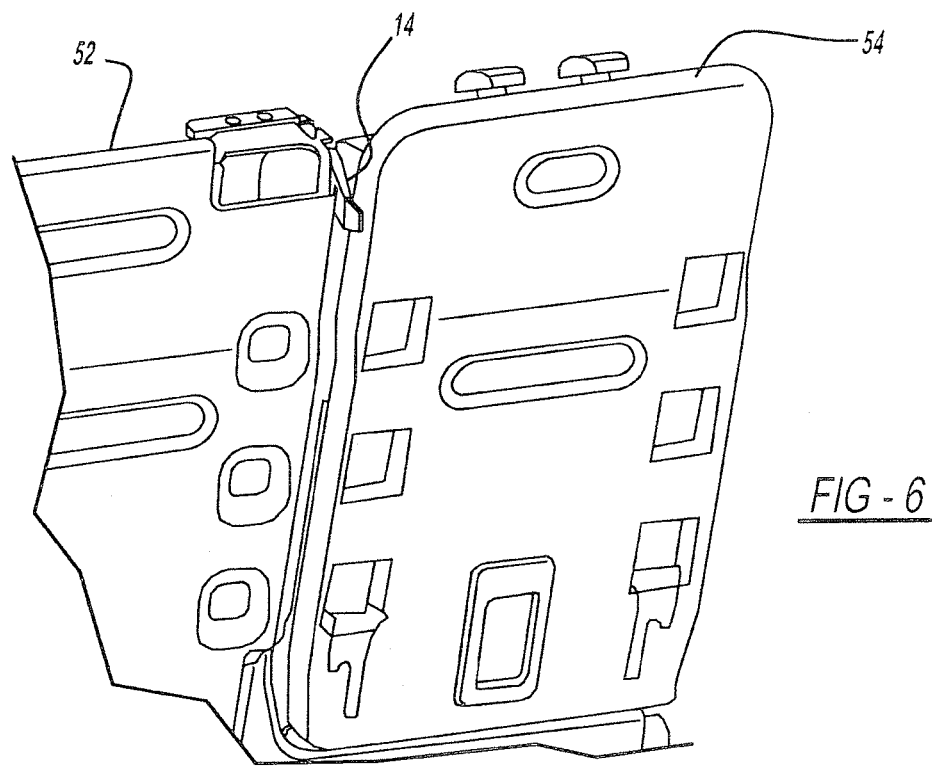
FIG. 6 is a view illustrating an alternative use of the lock assembly of the disclosed invention in relation to two seat backs with both seat backs in their upright positions.
Figure 7:
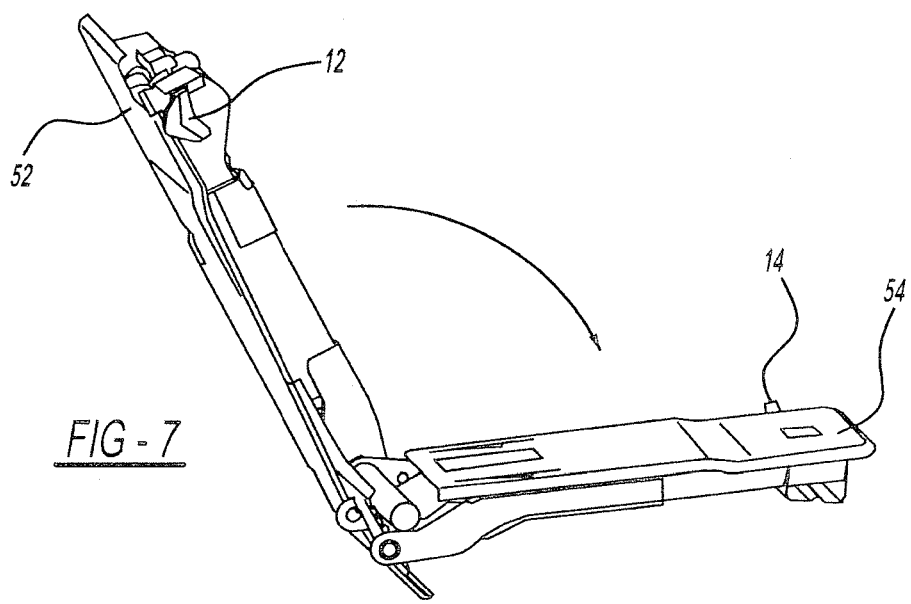
FIG. 7 is a view similar to that of FIG. 6 illustrating one of the seat backs to its down position.

As noted above, while the lock assembly 10 of the disclosed invention is described for use in relation to a vehicle seat back and a pivoting armrest, the lock assembly 10 may find other applications in vehicle seating. An alternative application is illustrated in FIGS. 6 and 7 in which a pair of side by side seat backs 52 and 54 are shown in their upright positions. Attached to the seat back 52 is the cupped shoe 12 and attached to the seat back 54 is the lock plate 14. In FIG. 6, the lock plate 14 is attached to the cupped shoe 12 and the seat back 54 is locked in place against the seat back 52.

In FIG. 7 the seat back 54 is shown having been released from locked engagement from the seat back 52 by release of the lock plate 14 from the cupped shoe 12 according to the procedure described above. Once released, the seat back 54 can be pivoted to its lowered position in relation to the seat back 52 as illustrated.

As set forth above, the cupped shoe 12 and the molded lock plate 14 are attached the frame of the seat back and to the armrest respectively. However, it is to be understood that the cupped shoe 12 and the molded lock plate 14 may be attached to opposite components, whereby the cupped shoe 12 is attached to the armrest and the molded lock plate 14 is attached to the seat frame. In addition, both the cupped shoe 12 and the molded lock plate 14 may be attached to seatback frames in the event that two adjacent seatbacks are provided with one seatback being pivotably movable between an upright and a stowed position with respect to the other seatback.

While the disclosed invention has been illustrated in the figures and described in the accompanying text as being directed to application of the lock assembly 10 between an armrest on a bench seat and the adjacent seat back or between two adjacent seat backs it is to be understood that the lock assembly 10 may have further application. As non-limiting examples of such application, the lock assembly 10 may be used between two adjacent seat bases or may be used with an armrest pivotably fitted to the side of a bucket seat.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A lock assembly for releasably locking a pivotable armrest of a vehicle to an adjacent seat back, the lock assembly comprising:
   a first locking element fixedly attached to the seat back, the first locking element having an engagement surface and a cover;
   a second locking element movably attached to the armrest, the second locking element having an engagement surface, said second locking element being separable from said cover;
   a series of engagement channels defined on one of said engagement surfaces; and
   a series of ridges formed on the other of said engagement surfaces, said ridges being releasably engageable with said channels.

2. The lock assembly of claim 1 wherein said first locking element includes a cover having an interior and wherein said engagement surface is formed on said interior.

3. The lock assembly of claim 1 wherein said second locking element includes a spring loaded attachment assembly, said assembly providing said movable attachment to the armrest.

4. The lock assembly of claim 3 wherein said second locking element includes an engagement portion on which said engagement surface is formed and an anchoring portion.

5. The lock assembly of claim 4 wherein said spring loaded attachment assembly includes a central sliding rod attached to said engagement portion and a retractor spring attached to said central sliding rod.

6. The lock assembly of claim 4 further including a release tab extending from said engagement portion.

7. The lock assembly of claim 1 wherein said first locking element includes a cover having a tab-passing slot formed therein and wherein said second locking element includes a release tab extending therefrom, said release tab extending through said tab-passing slot when said first locking element and said second locking element are releasably engaged with one another.

8. A lock assembly for locking a first component of a vehicle seat to a second component, one of the first and second components being movable with respect to the other, the lock assembly comprising:
   a first locking element fixedly attached to the first component, the first locking element having a cover, said cover having an interior engagement surface, said cover having a tab-passing slot formed therein;
   a second locking element movably attached to the second component, the second locking element having an engagement surface and a release tab, said second locking element being separable from said cover;
   a series of engagement channels defined on one of said engagement surfaces; and
   a series of ridges formed on the other of said engagement surfaces, said ridges being releasably engageable with said channels, wherein said release tab extends through said tab-passing slot of said cover when said first locking element and said second locking element are releasably engaged with one another.

9. The lock assembly of claim 8 wherein said second locking element includes a spring loaded attachment assembly, said assembly providing said movable attachment to the second component.

10. A lock assembly for locking a first component of a vehicle seat to a second component, one of the first and second components being movable with respect to the other, the lock assembly comprising:
    a first locking element fixedly attached to the first component, the first locking element having an engagement surface and a cover;
    a second locking element movably attached to the second component, the second locking element having an engagement surface, said second locking element being separable from said cover, said second locking element includes an anchoring portion, an engagement portion on which said engagement surface is formed, and a spring loaded attachment assembly, said spring loaded attachment assembly providing said movable attachment to the second component, said spring loaded attachment assembly including a central sliding rod attached to said engagement portion and a retractor spring attached to said central sliding rod;
    a series of engagement channels defined on one of said engagement surfaces; and
    a series of ridges formed on the other of said engagement surfaces, said ridges being releasably engageable with said channels.

11. The lock assembly of claim 10 wherein said cover has an interior and wherein said engagement surface is formed on said interior.

12. The lock assembly of claim 11 wherein said first locking element includes a base and wherein said cover and said base define a pocket formed therebetween.

13. The lock assembly of claim 10 further including a release tab extending from said engagement portion.

14. The lock assembly of claim 10 wherein said cover has a tab-passing slot formed therein.

15. The lock assembly of claim 14 wherein said second locking element includes a release tab extending therefrom, said release tab extending through said tab-passing slot when said first locking element and said second locking element are releasably engaged with one another.

16. The lock assembly of claim 10 wherein said first locking element includes at least one attachment stud extending therefrom.

* * * * *